United States Patent [19]

Hawerkamp

[11] Patent Number: 4,510,004
[45] Date of Patent: Apr. 9, 1985

[54] APPARATUS AND METHOD FOR PRODUCING A TUBE FROM A CONTINUOUS FORMED EXTRUDED SUPPORTING MATERIAL AND A PROFILED MATERIAL

[76] Inventor: Manfred Hawerkamp, Altenrather Strasse 47, 5210 Troisdorf, Fed. Rep. of Germany

[21] Appl. No.: 452,012

[22] Filed: Dec. 21, 1982

[30] Foreign Application Priority Data

Oct. 4, 1982 [DE] Fed. Rep. of Germany ....... 3213551

[51] Int. Cl.³ ............................ B31C 1/00; B31C 3/00
[52] U.S. Cl. ..................................... 156/143; 138/122; 156/195; 156/244.12; 156/244.13; 156/244.23; 156/431; 156/446; 156/500
[58] Field of Search .................. 156/143, 184, 244.11, 156/244.12, 244.13, 431, 446, 459, 500, 244.23, 195; 138/122

[56] References Cited

U.S. PATENT DOCUMENTS

| | | | |
|---|---|---|---|
| 3,617,415 | 11/1971 | Hawerkamp | 156/244.12 |
| 3,671,348 | 6/1972 | Kemsey-Bourne | 156/244.13 |
| 3,988,190 | 10/1976 | McWilliams | 156/244.13 |
| 4,130,453 | 12/1978 | Hollister | 156/187 |

Primary Examiner—Jay H. Woo
Assistant Examiner—Timothy W. Heitbrink
Attorney, Agent, or Firm—McGlew and Tuttle

[57] ABSTRACT

A device and method for producing a tube comprises a rotatable mandrel over which the tube is formed and an extruder alongside the mandrel having a nozzle which extrudes a supporting material having a hollow portion onto the mandrel at a selected angle in a manner to form a continuously helically wound strip on the mandrel as the mandrel is rotated and the mandrel and the extruder are moved relatively in respect to the longitudinal axis of the tube. A supply of a profiled material such as a tubular reinforcement is provided alongside the mandrel and advantageously comprises a reel supply over which the tube is wound and which is connected through a feeder in the form of upper and lower rollers which engage the profiled material and feed it through the extruder into association with the supporting material and into the hollow portion thereof. In accordance with the method of the invention, the feeder operates to provide a positive feeding of the profiled material into the extruder so that it may be combined with the supporting material and fed without tension onto the mandrel as the mandrel is rotated.

3 Claims, 4 Drawing Figures

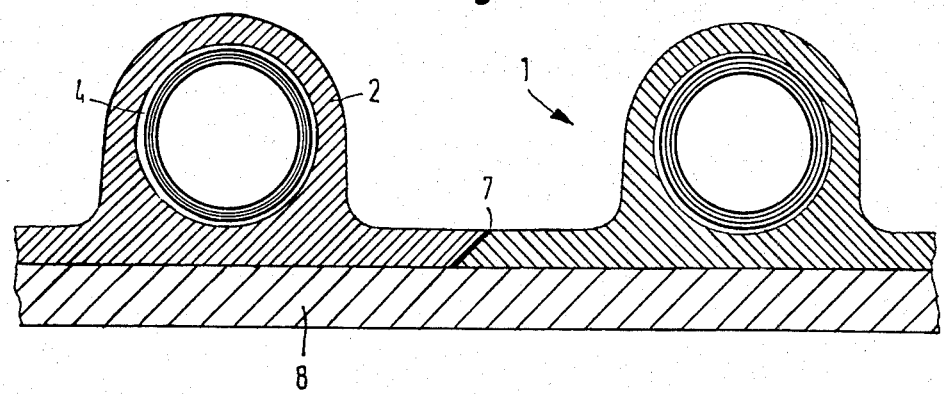
Fig. 2
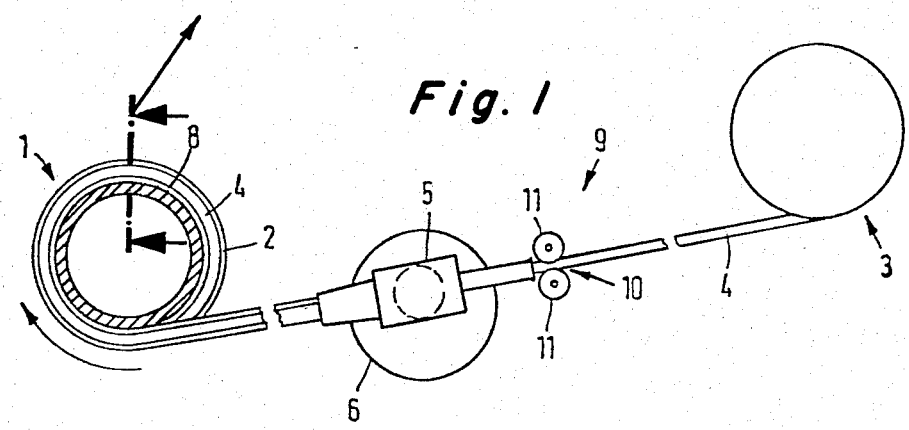
Fig. 1
Fig. 4
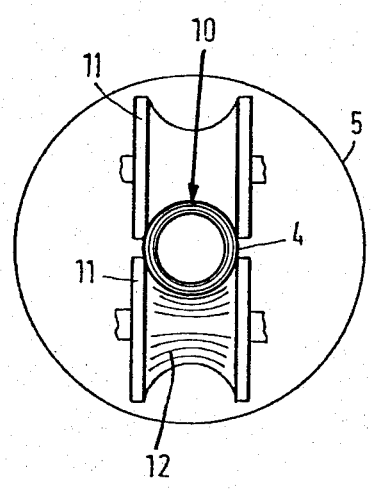
Fig. 3
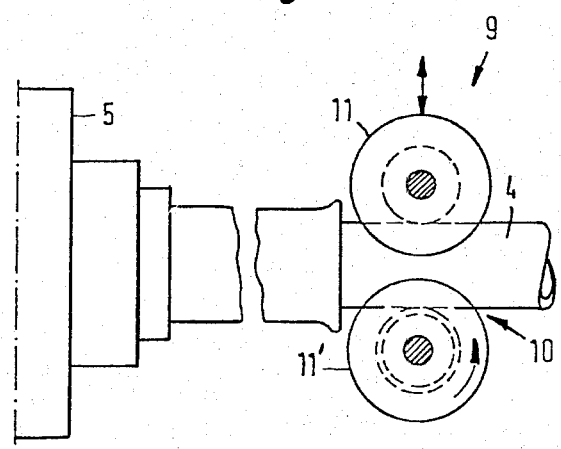

APPARATUS AND METHOD FOR PRODUCING A TUBE FROM A CONTINUOUS FORMED EXTRUDED SUPPORTING MATERIAL AND A PROFILED MATERIAL

FIELD AND BACKGROUND OF THE INVENTION

This invention relates in general to an apparatus and method for forming tubes and in particular to a new and useful device for extruding a supporting material onto a mandrel along with a profiled material in a manner such that the material arrives at the mandrel in a combined form substantially without any tension.

This invention relates particularly to a device for the production of a tube, container or like cylindrical object (hereafter referred to simply as a tube) from helically wound strip material, more particularly a hollow thermoplastics profile section, in which the strip material is wound onto a mandrel, more particularly a drum, together with a supporting profiled material paid off from a material feeder, more particularly a supporting hose inserted inside the hollow profile section, after leaving the nozzle of an extruder in a deformable state, to produce an obliquely wound assembly welded at the joints between successive turns.

In the production of a tube, having a wall profiled in longitudinal section as determined by a helically wound strip of thermoplastics synthetic material, it is known to wind a profiled material narrower than the strip material helically on a plain mandrel and then to wind thereon the strip material in a deformable state, forming overlapped or abutted, more particularly obliquely abutted, seams between turns of the same helical pitch. In this connection, the strip material is fed warm and in the deformable state from the extruder, and the extruder, which has an appropriately shaped nozzle, is traversed across the rotating mandrel. The profiled material can be wound onto the mandrel simultaneously with the strip material, and the strip material can be deformed over the underlying wrapping or profiled material by rolling or other means.

To save material, the tube is usually formed with a hollow wall, i.e. it is wound from hollow profiled material. In this connection, the preferred supporting profiled material is a hose, preferably a plastics hose, which remains inside the tube wall. The supporting hose is intended to prevent the collapse of the still warm tube profile, in particular because the fully wound tube only cools gradually on the mandrel. However, the problem remains that the supporting profiled material, i.e. the supporting hose, is drawn by the rotating mandrel off the material feeder, which usually consists of a bobbin. The drawing force applied by the mandrel must be sufficiently high to draw the supporting hose off the bobbin and through the extruder nozzle. Because of this relatively high drawing force, however, both the supporting hose and the hollow profiled material, which is still in a deformable state, undergo a certain amount of deformation, so that it is frequently impossible to maintain the desired profile cross-section, with particular reference to the height of the profile, with the result that the profile of the tube becomes non-uniform.

SUMMARY OF THE INVENTION

The invention provides a device with which there is no longer any risk of deforming the hollow tube, its supporting material, and in particular its supporting hose. The device ensures that the desired profiled cross-section can always be satisfactorily maintained, including the height of the profile.

According to the present invention, a device is provided for the production of a tube from helically wound strip material is wound onto a mandrel, together with a supporting profiled material paid off from a material feeder. The material is fed from the nozzle of an extruder in a deformable state and onto the mandrel to produce an obliquely wound assembly welded at the joints between successive turns. The extruder nozzle is preceded by a feeder which draws the supporting profiled material from a source, such as a bobbin, and urges it into the nozzle. The feeder for the supporting profiled material operates under overfeed conditions such that the ribbon of supporting profiled material is virtually under zero tension when wound onto the mandrel along with the strip or hollow profiled material. Hence there are not tensile forces capable of deforming either the strip material or the supporting profiled material.

The feeder preferably has traction rolls providing at least one feeding channel for the supporting profiled material or supporting hose and at least one of the traction rolls is power driven, through an interposed gearbox if needed. At least one of the two traction rolls is adjustable relative to the other traction roll, so that the cross-section of the traction channel can be varied. In this way, it is easy to adjust the traction force to the cross-section of the supporting profiled material in use. In order to ensure that the supporting profiled material is satisfactorily drawn off the bobbin, fed through and introduced into the extruder nozzle, it is preferable to provide at least one of the two traction rolls with a grooved face of increased frictional drag, for example a ribbed face coated with rubber or a plastics material.

The advantages accruing from the invention are to be seen substantially in that it provides a device for the production of a tube from helically wound strip material, more particularly hollow profile sections, having a feeder for the supporting material, more particularly the supporting hose, preceding the extruder nozzle, so that the supporting profiled material or the supporting hose is fed in satisfactorily and under almost zero tension. With the invention, there is no longer any risk of deformation as the strip or hollow profiled material is wound onto the mandrel along with the supporting profiled material or supporting hose, and it is possible to produce tubes, containers or like cylindrical objects having the desired profiled cross-section, with particular reference to the constant height of the profile. This applies in principle to any profiled cross-section, including solid profiles, but is particularly advantageous with hollow profiles having inserted supporting hose. In every case, the profile can be held within the prescribed tolerances.

Accordingly, it is an object of the invention to provide a device for producing a tube which comprises a rotatable mandrel of which the tube is formed with an extruder alongside the mandrel having a nozzle extruding a supporting material which material has a hollow portion onto a mandrel at a selected angle in a manner to form a continuous helically wound strip on said mandrel with a welded together seam between adjacent turns of this strip so as to form the tube and including a supply of a profiled material which is alongside this extruder and is fed by a feeder to the extruder so that it combines with the supporting material and is presented to the mandrel at substantially no tension.

A further object of the invention is to provide a method of producing the tube in which the supporting material in a plastic state is deposited onto a rotating mandrel and at the same time a profiled material such as a tube is directed onto the plastic supporting material and combined therewith and is presented to the mandrel with substantially no tension.

A further object of the invention is to provide a device for producing a tube which is simple in design, rugged in construction and economical to manufacture.

The varius features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment is illustrated.

BRIEF DESCRIPTION OF THE DRAWINGS

In the drawings

FIG. 1 is a diagrammatic side elevation of a device constructed in accordance with the invention for the production of a tube from helically wound strip material;

FIG. 2 is a fragmentary longitudinal section, through the mandrel and wound hollow profiled material, which contains supporting hose;

FIG. 3 is a larger scale fragmentary side elevation of the feeder of FIG. 1; and FIG. 4 is a right side elevational view.

BRIEF DESCRIPTION OF THE PREFERRED EMBODIMENT

Referring to the drawings in particular the invention embodied therein comprises a device for producing a tube generally designated 1 which comprises a rotatable mandrel 8 over which the tube is formed. An extruder 6 alongside the mandrel has a nozzle 5 which extrudes the supporting material 2 which has a hollow portion onto the mandrel 8 at a selected angle and in a manner to form a continuous helically wound strip on the mandrel with a welded together seam between adjacent turns so as to form the tube. The extruder 5 and the mandrel 8 are relatively movable so that the successive turns are deposited along the length of the mandrel as the mandrel is rotated. The supply of a profiled material such as a tube 4 comprises a reel supply or a bobbin 3. In accordance with the invention feed means 9 for drawing off the profiled material 4 from the reel supply 3 and directing it through the nozzle 5 for combining it through the supporting material 2 and for presenting the combination onto the mandrel 8 ensures that the combination is fed to the mandrel with little or no tension.

The device in the drawings is for the production of tube 1 from helically wound hollow profiled material 2 made from a thermoplastics synthetic material, in which the hollow profiled material 2 is wound onto mandrel 8 having a drum form. The material 2 is wound together with supporting hose 4 drawn from material source 3 in the form of a bobbin and inserted in the hollow profiled material 2 leaving the nozzle 5 of extruder 6 in a deformable state. The combined material 2 and the hose 4 produce an oblique winding seam 7 between successive turns which are welded together at the winding seam 7.

The nozzle 5 is preceded by feeder 9 for the supporting hose 4, which draws the supporting hose 4 from the bobbin 3 and and urges it into the nozzle 5. Under these circumstances, it is no longer necessary to apply to the mandrel 8 any of the tensile force otherwise required to draw off the supporting hose 4 and urge it through the nozzle 5.

Consequently, the hollow profiled material 2 and the inserted supporting hose 4 can be simultaneously wound onto the mandrel 8 without deformation. The feeder 9 has traction rolls 11, 11' providing at least one feeding channel 10 for the supporting hose 4, and at least one traction roll is power driven, through an interposed gearbox (not shown) if needed. Moreover, at least one of the two traction rolls 11 and 11' is adjustable relative to the other traction roll, so that the cross-section of the traction channel and the applied traction force can be varied. Finally, at least one of the two traction rolls 11 and 11' has a grooved face 12 of increased frictional drag, for example a ribbed face coated with rubber or a plastics material.

While a specific embodiment of the invention has been shown and described in detail to illustrate the application of the principles of the invention, it will be understood that the invention may be embodied otherwise without departing from such principles.

What is claimed is:

1. A device for producing a tube, comprising:
    a rotatable mandrel (8) over which the tube (1) is formed;
    an extruder (5) alongside said mandrel having a nozzle with an opening therethrough for extruding a thermoplastic supporting material (2) which material has a hollow portion and is directed onto said mandrel in a selected angle, said mandrel and said extruder being relatively movable in relation to the axis of said mandrel so as to form a continuous helically wound strip on said mandrel with a welded together seam (7) between adjacent turns to form the tube (1);
    a supply bobbin (3) of profiled reinforcing tube material (4) alongside said extruder;
    a pair of traction rolls (11) for drawing off the profiled material (4) from said supply bobbin and directing it into said extruder nozzle for combining it with the supporting material (2) to form a combination and presenting the combination onto said mandrel, said roller being disposed between said supply bobbin and said extruder for pushing the profiled material into said nozzle, said rolls defining a feed passage (10) for the profiled material and at least one of said rolls being power driven to push the profiled material; and
    means for rotating said mandrel by a relative force with respect to said power driven roll so that substantially no tension is applied to the combination between said extruder and said mandrel whereby the supporting material in the combination is not deformed.

2. A device according to claim 1, wherein at least one of said rolls has a grooved face of increased frictional drag with a coated surface of a rubber material.

3. A method of producing a tube using a mandrel and an extruder for forming a supporting strip material having a hollow portion, and a reel supply of reinforcement tube material alongside the extruder, the extruder having a nozzle with an opening therethrough for extruding the supporting strip material, comprising:
    feeding the reinforcement tube material off the reel supply and passing it through the nozzle of the extruder by pushing the reinforcement tube material into the opening of the nozzle;

combining the reinforcement tube material with the supporting material which is extruded by the extruder to form the supporting strip material; and presenting the strip material to the mandrel with substantially no tension on the strip material;

feeding the reinforcement tube material being accomplished by engaging the reinforcement tube material between a pair of traction rolls having a passage therein for receiving the reinforcement tube material and driving one of the traction rolls for pushing the reinforcement material into the opening of the nozzle.

* * * * *